(12) United States Patent
Roger et al.

(10) Patent No.: US 9,507,013 B2
(45) Date of Patent: Nov. 29, 2016

(54) METHOD, DEVICE AND SYSTEM FOR PROCESSING RADAR SIGNALS

(71) Applicant: Infineon Technologies AG, Neubiberg (DE)

(72) Inventors: Andre' Roger, Munich (DE); Romain Ygnace, Munich (DE)

(73) Assignee: Infineon Technologies AG, Neubiberg (DE)

( * ) Notice: Subject to any disclaimer, the term of this patent is extended or adjusted under 35 U.S.C. 154(b) by 597 days.

(21) Appl. No.: 13/922,249

(22) Filed: Jun. 20, 2013

(65) Prior Publication Data

US 2014/0375491 A1    Dec. 25, 2014

(51) Int. Cl.
| | | |
|---|---|---|
| *G01S 7/292* | (2006.01) | |
| *G01S 13/34* | (2006.01) | |
| *G01S 7/35* | (2006.01) | |
| *G01S 13/93* | (2006.01) | |
| *G01S 7/02* | (2006.01) | |

(52) U.S. Cl.
CPC .............. *G01S 7/354* (2013.01); *G01S 7/2922* (2013.01); *G01S 7/2927* (2013.01); *G01S 13/343* (2013.01); *G01S 13/931* (2013.01); *G01S 2007/028* (2013.01); *G01S 2007/356* (2013.01)

(58) Field of Classification Search
CPC .............. G01S 7/292–7/2927; G01S 7/354; G01S 13/343; G01S 13/931
USPC ...................... 342/89, 91–93, 196
See application file for complete search history.

(56) References Cited

U.S. PATENT DOCUMENTS

| | | | | | |
|---|---|---|---|---|---|
| 4,680,589 | A | * | 7/1987 | Bryant ................. | G01S 7/2921 342/159 |
| 4,970,660 | A | * | 11/1990 | Marchant ............. | G06K 9/3241 342/90 |
| 5,361,072 | A | * | 11/1994 | Barrick ................. | G01S 7/35 342/133 |
| 5,499,030 | A | * | 3/1996 | Wicks ................... | G01S 7/292 342/159 |
| 6,011,507 | A | * | 1/2000 | Curran .................. | G01S 7/354 342/70 |
| 6,380,887 | B1 | * | 4/2002 | Suen .................... | G01S 13/532 342/159 |
| 9,024,809 | B2 | | 5/2015 | Testar | |
| 2003/0156057 | A1 | * | 8/2003 | Rohling ................ | G01S 7/288 342/109 |
| 2005/0156780 | A1 | * | 7/2005 | Bonthron ............. | G01S 13/343 342/107 |
| 2008/0088499 | A1 | * | 4/2008 | Bonthron ............. | G01S 13/931 342/104 |
| 2011/0163906 | A1 | * | 7/2011 | Yang .................... | G01S 7/03 342/27 |
| 2011/0163909 | A1 | * | 7/2011 | Jeong .................. | G01S 13/4463 342/70 |
| 2013/0027242 | A1 | * | 1/2013 | Lee ...................... | G01S 7/292 342/156 |
| 2013/0201054 | A1 | * | 8/2013 | Wang .................. | G01S 13/0218 342/93 |

FOREIGN PATENT DOCUMENTS

| | | |
|---|---|---|
| CN | 102707285 A | 10/2012 |
| JP | H3-242581 | 10/1991 |

(Continued)

OTHER PUBLICATIONS

Radar Signal Processings Using Multi-computer, The Institute of Electronics, Information and Communication Engineers, Kazuki Tamai et al., Mar. 1999.

*Primary Examiner* — Peter Bythrow

(74) *Attorney, Agent, or Firm* — Eschweiler & Associates, LLC

(57) ABSTRACT

An embodiment relates to a method for processing radar signals. The radar signals may include digitized data received by at least two radar antennas. The method may include determining CFAR results on FFT results based on data received by a first antenna, and applying the CFAR results to FFT results based on data received by a second antenna.

13 Claims, 10 Drawing Sheets

(56) References Cited

FOREIGN PATENT DOCUMENTS

| JP | 2000-180531 | 6/2000 |
| JP | 2000-230972 | 8/2000 |
| JP | 2003-215237 | 7/2003 |
| JP | 2005-083870 | 3/2005 |
| JP | 2011-242224 | 12/2011 |
| KR | 100902560 B1 | 6/2009 |

* cited by examiner

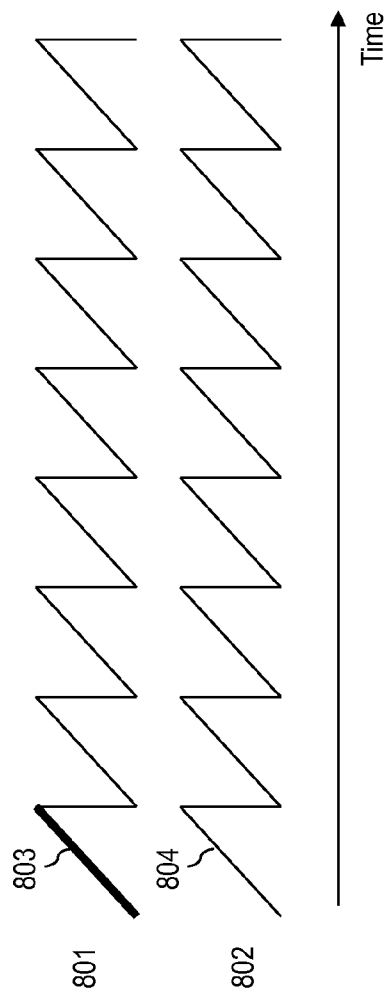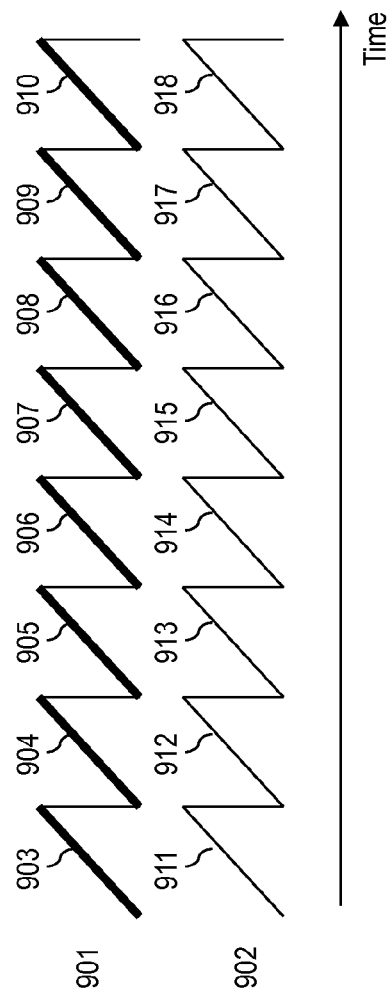

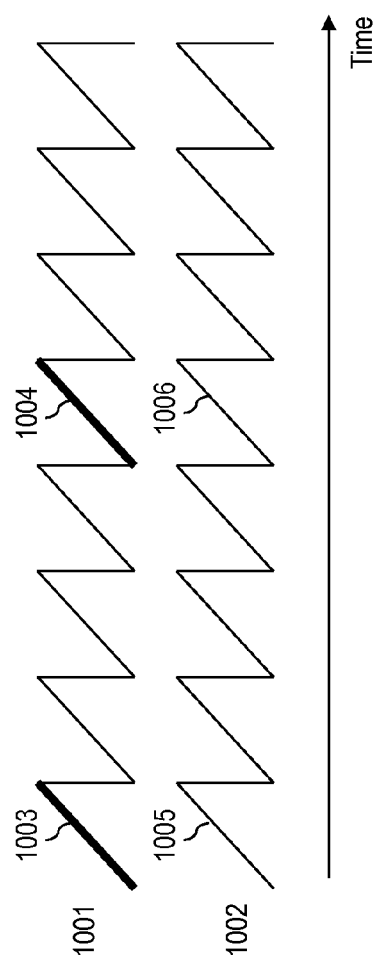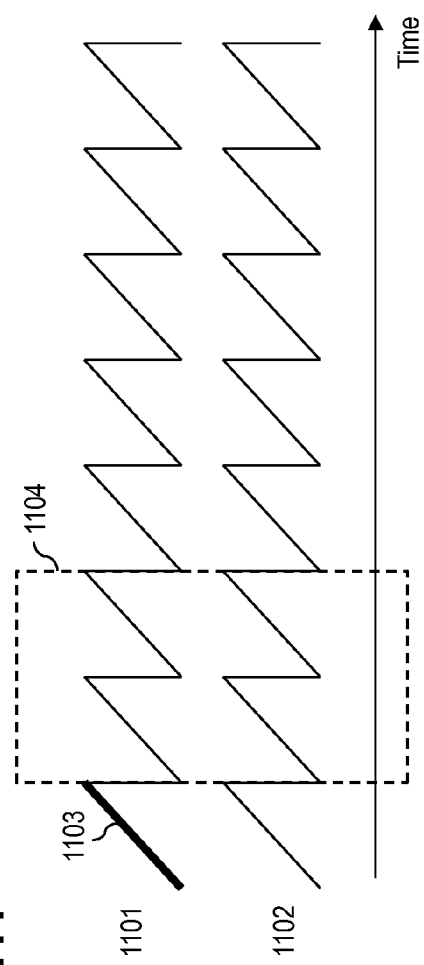

METHOD, DEVICE AND SYSTEM FOR PROCESSING RADAR SIGNALS

BACKGROUND

Embodiments relate to radar applications, in particular an efficient way to process radar signals obtained by at least one radar sensor, e.g., via at least one antenna. Processing radar signals in this regard in particular refers to radar signals received by a sensor or an antenna.

Several radar variants are used in cars for various application scenarios. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant-_false_ alarm_rate.

CFAR algorithms are often complex and require a significant amount of time and/or resources, e.g., costly computation power. In case they need several clock cycles to provide a result, post-processing becomes delayed which results in a limited real-time (or nearly real-time) capability of the whole system.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 8 shows an exemplary CFAR use case scenario utilizing a single ramp for CFAR computation purposes;

FIG. 9 shows another exemplary CFAR use case scenario utilizing all ramps of an antenna for CFAR computation purposes;

FIG. 10 shows a further exemplary CFAR use case scenario utilizing every n-th ramp of an antenna for CFAR computation purposes;

FIG. 11 shows a yet another exemplary CFAR use case scenario utilizing a first ramp of an antenna for CFAR computation purposes and waiting until CFAR computation is accomplished;

DETAILED DESCRIPTION OF THE PREFERRED EMBODIMENTS

A first embodiment relates to a method for processing radar signals, wherein said radar signals comprise digitized data received by at least two radar antennas, comprising the steps
- determining CFAR results on FFT results based on data received by a first antenna;
- applying the CFAR results to FFT results based on data received by a second antenna.

A second embodiment relates to a device for processing radar signals
- comprising a FFT engine for determining FFT results based on digitized data received from at least two antennas;
- comprising a CFAR engine which is operable
  - in a computation mode for determining CFAR results based on the FFT results of one of the antennas; and
  - in a filtering mode for filtering FFT results of at least one other antenna based on the CFAR results determined in the computation mode.

A third embodiment relates to a module comprising at least two devices as described herein, further comprising an address comparator connected to the FFT engine of each of the devices for synchronizing operation of the at least two devices.

A forth embodiment is directed to a system for processing radar signals comprising:
- means for providing first FFT results based on data received by a first antenna and for providing second FFT results based on data received by a second antenna;
- means for determining CFAR results on the first FFT results and for applying the CFAR results to the second FFT results.

Figure 1:
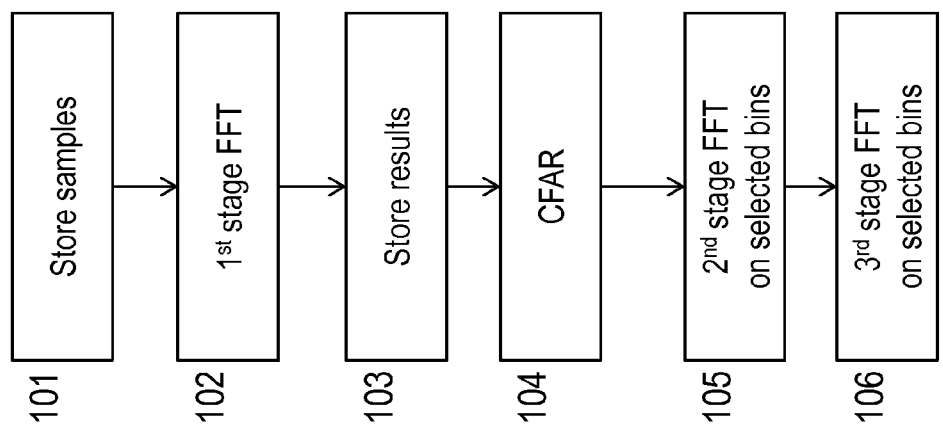
FIG. 1 shows an exemplary flow diagram comprising steps of how data can be processed in a radar application.

FIG. 1 shows an exemplary flow diagram comprising steps of how data can be processed in a radar application. In a step 101, samples received by a sensor are stored. In a step 102, a first-stage FFT is conducted and in a step 103 the results are stored. In a step 104 a CFAR algorithm is run on the data stored in the step 103. In a subsequent step 105, a second stage FFT may be conducted on selected bins and in a step 106 a third stage FFT may be conducted on selected bins.

A bin in this regard in particular refers to a frequency or a frequency rage that could be associated with a potential target (i.e. at least one potential target). The bin comprises at least one FFT result (which may be identified by the CFAR algorithm), it may in particular refer to at least one FFT result.

Figure 2:
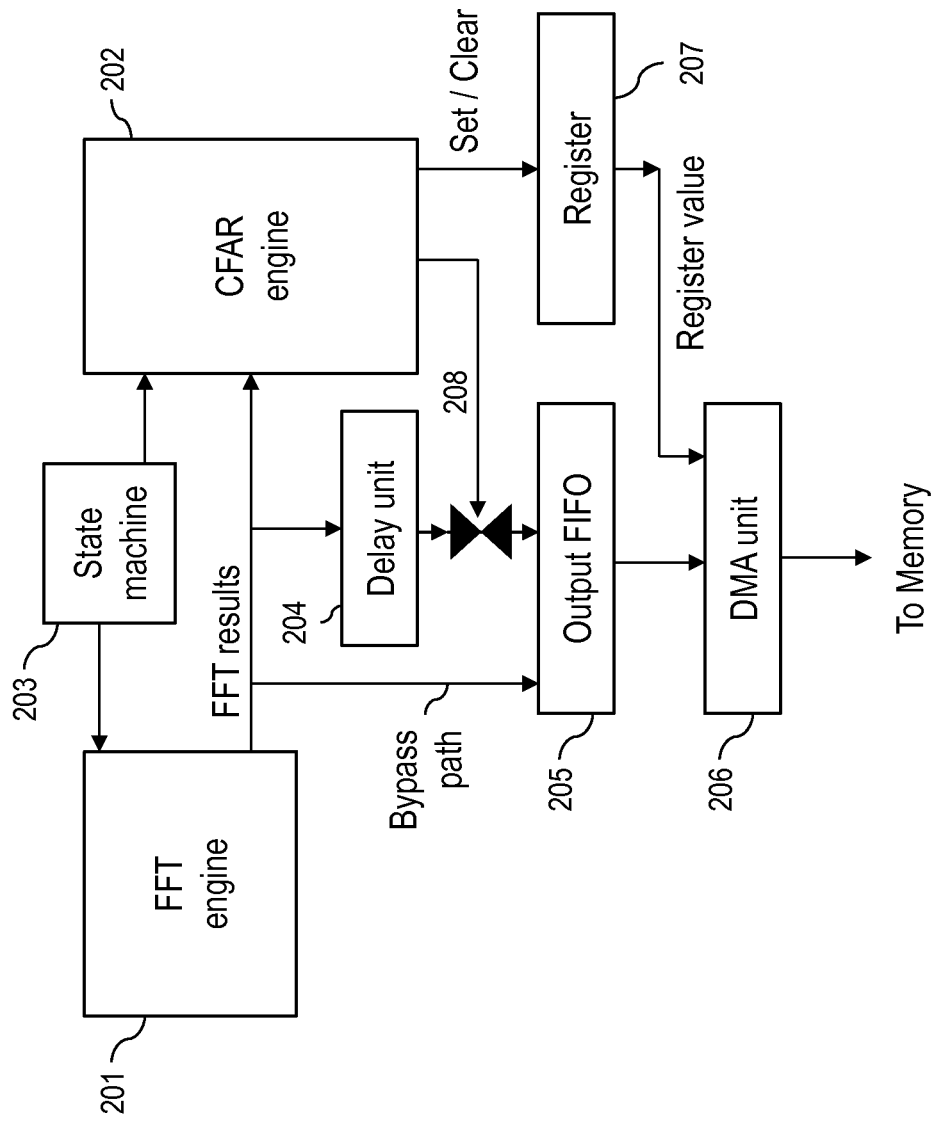
FIG. 2 shows an exemplary schematic architecture utilizing a combination of an FFT engine and a CFAR engine.

FIG. 2 shows an exemplary schematic architecture utilizing a combination of an FFT engine 201 and a CFAR engine 202. A state machine 203 is connected to the FFT engine 201 and to the CFAR engine 202. FFT results from the FFT engine 201 can be conveyed to an output FIFO 205 (FIFO: first-in-first-out, wherein the output FIFO 205 may comprise at least one FIFO register) to a delay unit 204 and to the CFAR engine 202. Results 208 computed by the CFAR engine 202 are used to enable writing the FFT results stored in the delay unit 204 to the output FIFO 205. The CFAR engine provides a SET/CLEAR signal to a register 207, wherein said register 207 allows addressing bins of interest pursuant to the value of the register 207. The register value of the register 207 and the output of the output FIFO 205 are conveyed to a DMA unit 206 (DMA: direct memory access), which is used to write results to a memory device.

The CFAR engine 202 may comprise an internal address counter, which may be updated each time a new bin of interest is checked.

If the CFAR engine 202 is not enabled and not active, the state machine 203 is set such that FFT results from the FFT engine 201 are conveyed via a bypass path (preferably at full speed) from the FFT engine 201 to the output FIFO 205.

If the CFAR engine 202 is enabled, the state machine 203 is set such that FFT results are conveyed from the FFT engine 201 to the CFAR engine 202 for computation, e.g., FFT results may be passed to the CFAR engine 202 at a slower rate than the FFT engine 201 could achieve.

If the CFAR engine 202 is enabled and active and if the CFAR engine is in a computation mode, the following steps may apply:
  The results 208 from the CFAR engine 202 enable writing (or not writing) of FFT result delayed by the delay unit 204 to the output FIFO 205.
  The respective bit for the bin associated with the FFT result to be written to the output FIFO 205 is set in the register 207.
  FFT computation may be paused until the CFAR engine 202 has completed its calculation, which may be the case with a rate amounting to 0.5 bins per clock cycle.
  The CFAR computation may be enabled for only a first ramp or for one ramp every 16 ramps (details about the ramp(s) and CFAR computations based on one or more ramps are explained below).

Hence, CFAR computation determines bins, i.e. frequencies or frequency ranges within the spectrum provided by the FFT, which are promising candidates for targets, e.g., vehicles travelling in front of a car reflecting an emitted radar signal. These bins can be addressed (as a result of the CFAR filtering, see also FIG. 3 below) by setting bits in the register 207, wherein the FFT results associated with these bins are stored in the output FIFO 205 and are subject to further processing.

If the CFAR engine 202 is enabled and active and if the CFAR engine 202 is in a filtering mode, the following steps may apply:
  For each bin, the CFAR engine 202 writes a corresponding bit in the register 207 thereby indicating the bins that are of interest in order to define if the output should be filtered or not.
  The CFAR engine 202 may run at a speed of 1 bin per clock cycle.

The approach presented in particular allows combining FFT and CFAR in an efficient manner. Hence, the FFT throughput may be reduced to enable processing of CFAR "on-the-fly", i.e. substantially at the same time. Hence, FFT bins can be filtered based on the results of the CFAR calculations and it may thus not be necessary to store all FFT results in the memory.

It is also an example to utilize CFAR in a dual mode:
  (1) In a first mode, the FFT results are analyzed and bins are filtered based on the selected CFAR algorithm and/or a predetermined sensitivity. Filter results may be updated indicating which bins have been filtered. The bins may all be written to the memory.
  (2) In a second mode, the FFT results are analyzed and bins are filtered based on the selected CFAR algorithm and/or a predetermined sensitivity. Filter results may be updated indicating which bins have been filtered. The bins may be written to the memory according to the filter results (i.e. not all bins may have to be written to the memory).

Figure 3:
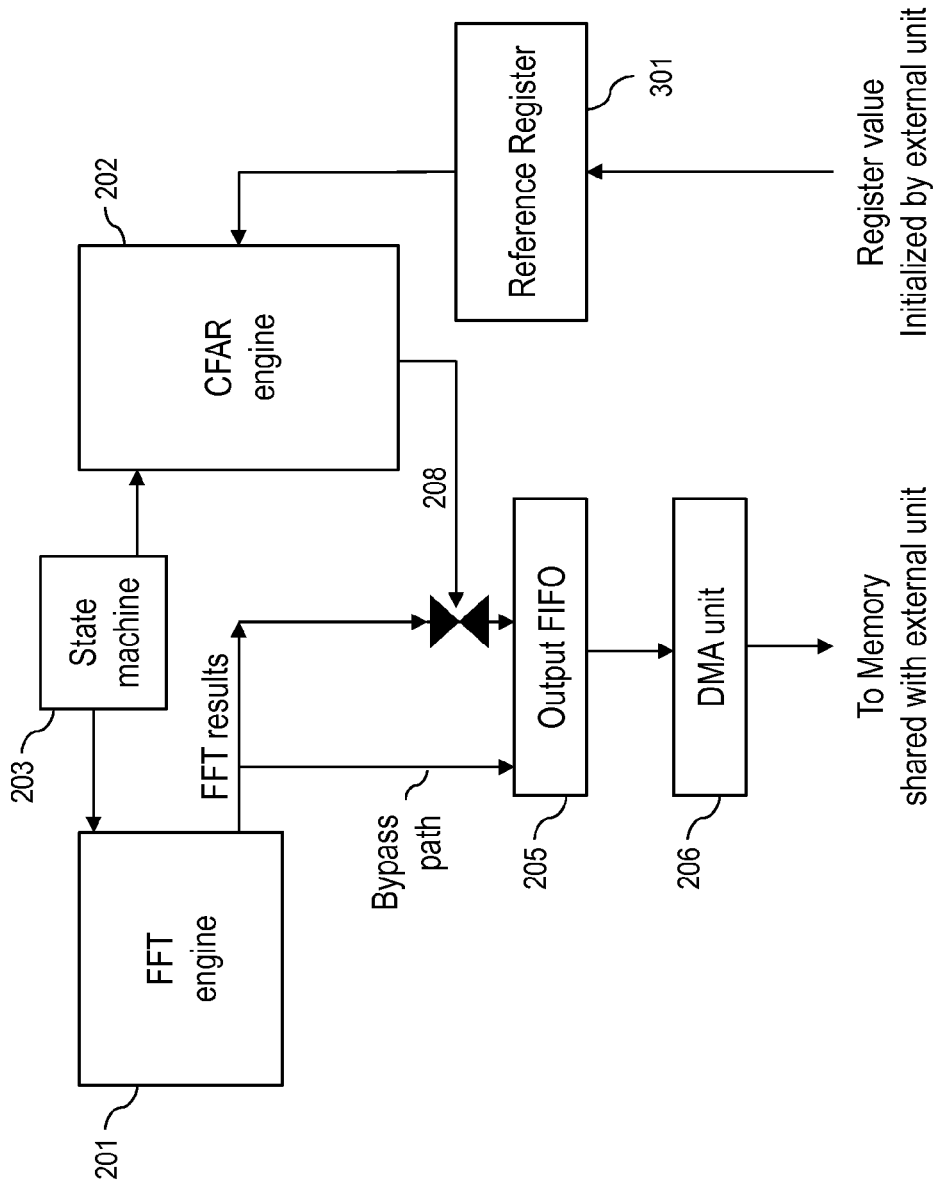
FIG. 3 shows a schematic architecture utilizing a combination of the FFT engine and the CFAR engine as a variant to the example of FIG. 1.

FIG. 3 shows a schematic architecture utilizing a combination of the FFT engine 201 and the CFAR engine 202 as a variant to the example of FIG. 1. In contrast to FIG. 1, FIG. 2 does not comprise the delay unit 205 and the register 207. Instead, the FFT results are conveyed to the output FIFO 205, enabled by the results 208 of the CFAR engine 202 without any delay unit. Also, a reference register 301 receives a register value, e.g., from an external unit. The reference register 301 indicates the bins of interest and its output is connected to the CFAR engine 202. The memory to which the DMA unit 206 is connected may be shared with the external unit that also supplies values for the reference register 301.

If the CFAR engine 202 is not enabled and not active, the state machine 203 is set such that FFT results from the FFT engine 201 are conveyed via the bypass path (preferably at full speed) from the FFT engine 201 to the output FIFO 205.

If the CFAR engine is enabled and active and if the CFAR engine 202 is in a filtering mode, the CFAR engine 202 may provide FFT filtering based on CFAR results computed by an external unit (e.g., an external DSP or an external microcontroller unit (MCU)), wherein the external unit writes data in the reference register 301 thereby defining bins of interest.

The scenario according to FIG. 3 in particular allows applying the same CFAR information across multiple antennas.

This approach may be operable with reduced memory requirements, e.g., with regard to size and/or bandwidth of the memory. The computation power and performance can be efficiently distributed among several processing stages.

Figure 4:
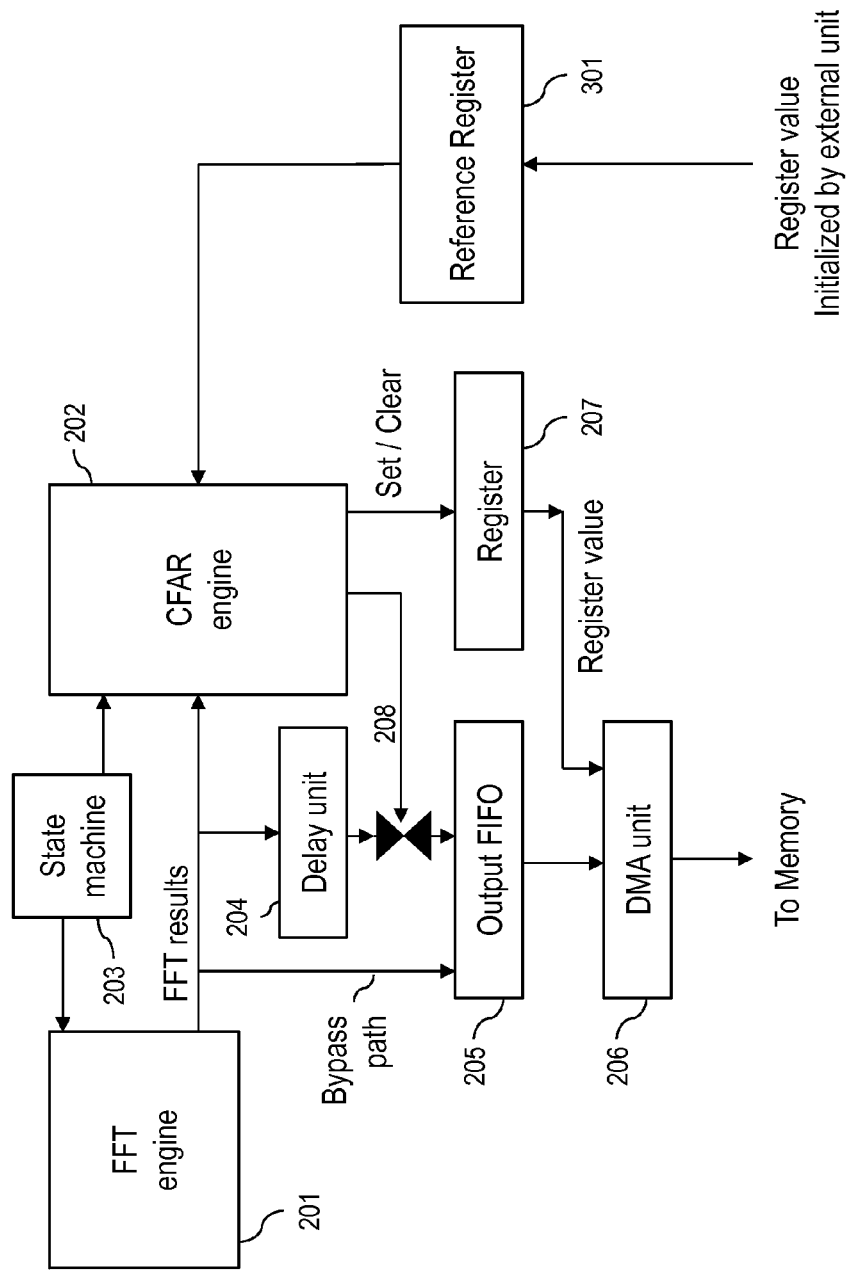
FIG. 4 shows a combined architecture according to FIG. 2 and FIG. 3.

FIG. 4 combines the architectures shown in FIG. 2 and FIG. 3. The CFAR engine 202 may provide computations on each ramp, wherein output filtering can be done via the reference register 301 initialized by the external unit. This allows an external unit to compare the computed CFAR-bins-filter for a given ramp and antenna with a reference CFAR-bins-filter.

Figure 6:
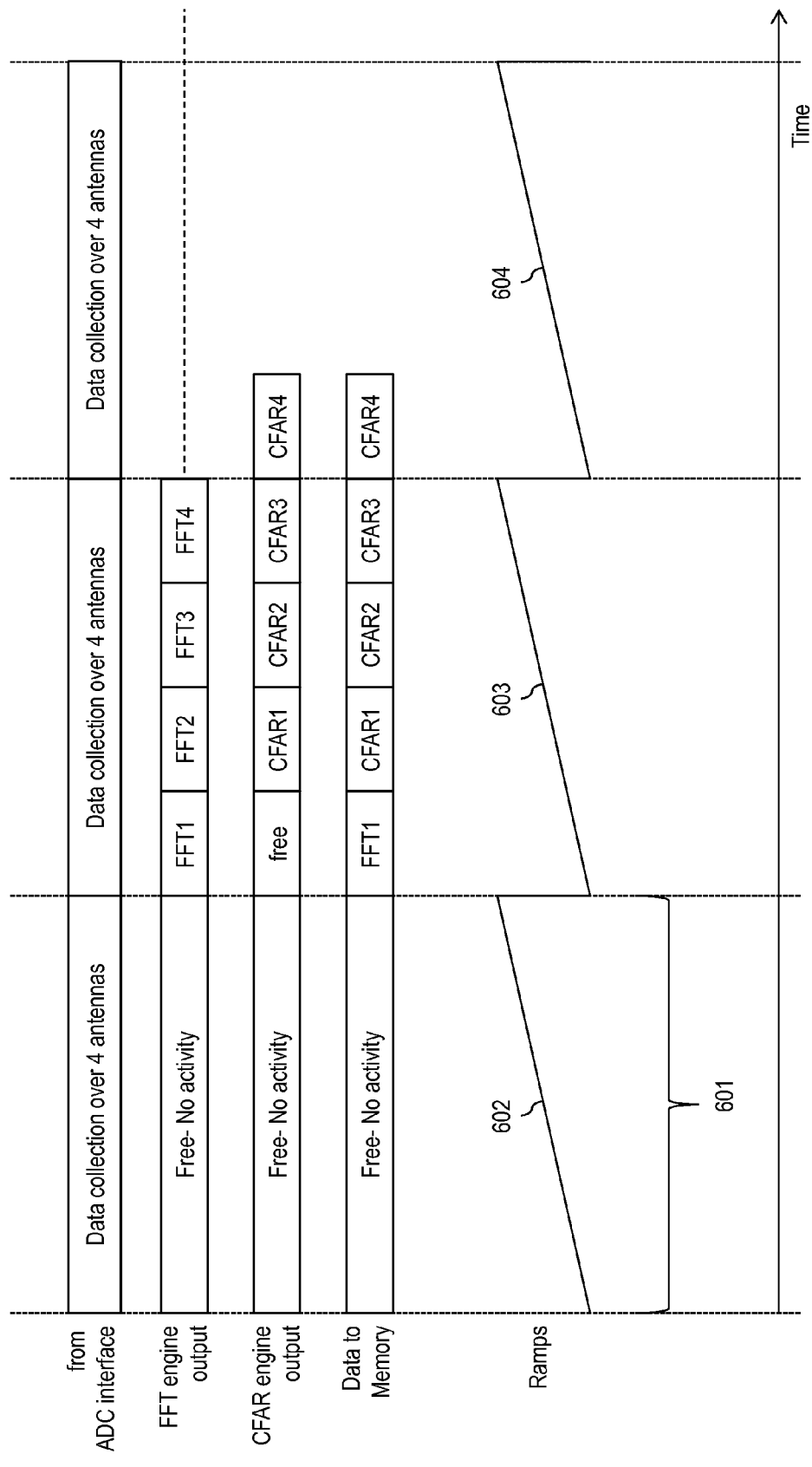
FIG. 6 shows a diagram visualizing an exemplary pipelining scheme.

FIG. 6 shows a diagram visualizing an exemplary pipelining scheme. The underlying implementation may have four antennas, wherein "ramp" indicates a duration 601 during which frequencies of a signal emitted by a radar device are changed: The radar device may thus emit radar signals at various frequencies of a predefined frequency range; such emission of radar signals may be achieved via one or via several antennas. In FIG. 6, three ramps 602 to 604 are visualized, indicating a repetitive pattern of emitted radar signals.

During the first ramp 602, data is collected via an ADC interface (ADC: analog-to-digital converter) over the four antennas, i.e. each of the received signals is analog-to-digital converted, wherein the digital signal is fed to the FFT engine 201. The FFT engine 201 and the CFAR engine 202 are in an idle state (for the duration of the ramp first 602). Accordingly, no data is output via the DMA unit 206.

During the second ramp 603, the FFT engine 201 provides FFT results FFT1 to FFT4 from each of the four antennas. The CFAR engine 202 computes results CFAR1 to CFAR4 based on the FFT results FFT1 to FFT4, i.e. CFAR1 based on FFT1, CFAR2 based on FFT2 etc. The DMA unit 206 thus conveys the FFT result FFT1 from the first antenna and the CFAR results CFAR1 to CFAR3 during the time of the second ramp 603 to the memory. The CFAR result CFAR4 based on the FFT results FFT4 from the forth antenna is conveyed toward the memory by the DMA unit 206 during the first portion of the third ramp 604.

The DMA unit 206 can be used to write data to the memory via a wide access. A microcontroller may read the data written to the memory to determine and/or monitor, e.g., floor noise on the radar signal.

Hence, the example visualized in FIG. 6 shows that the FFT result FFT1 from the first antenna may be used together with CFAR results based on the first to forth antenna. It is noted, however, that FIG. 6 shows a schematic approach, which may vary based on particular use case scenarios.

Figure 7:
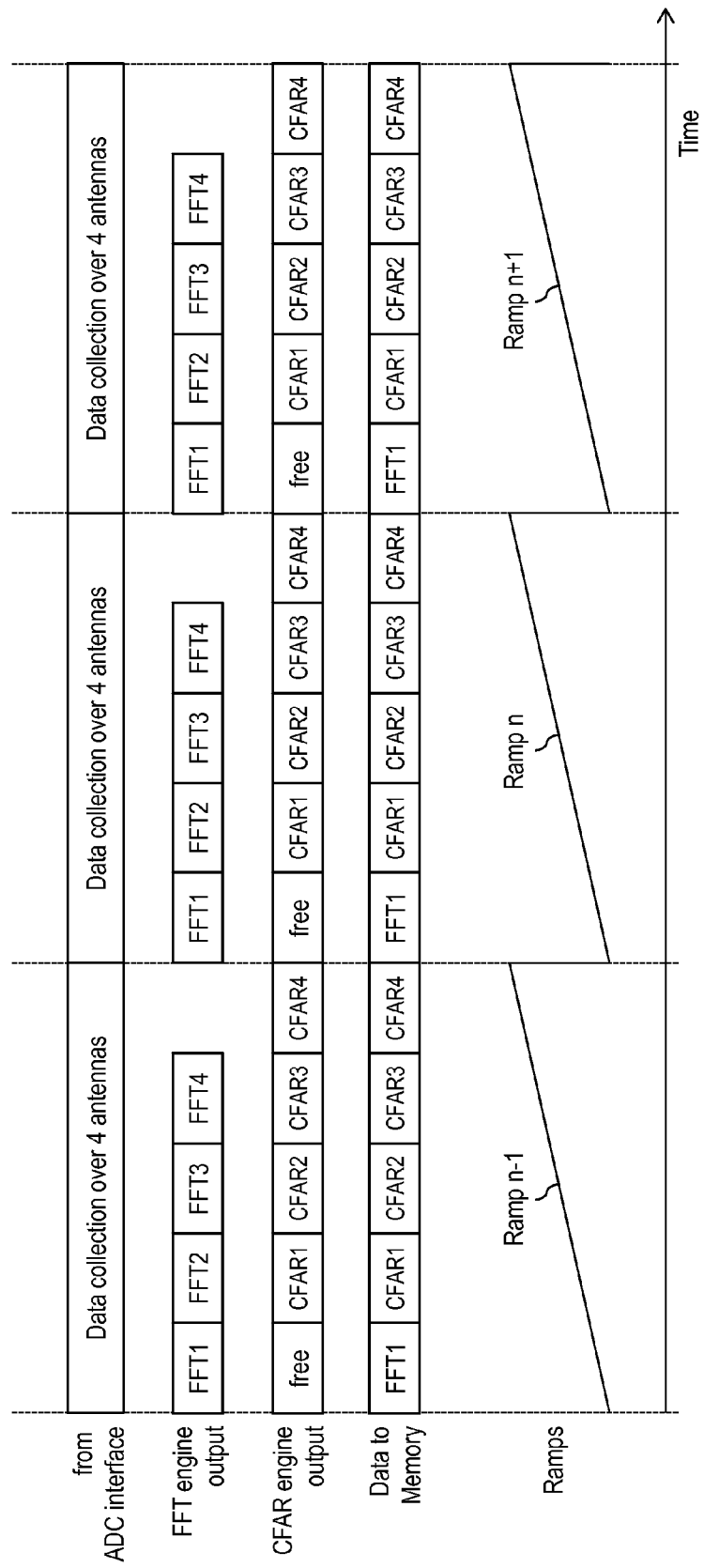
FIG. 7 shows an alternative pipelining scheme.

An alternative pipelining concept is visualized in FIG. 7: This solution may be used in combination with a slow sampling rate, wherein the CFAR processing time is shorter that the duration of a ramp. The example shows a scenario comprising three ramps n−1, n and n+1, wherein during each ramp:
 the FFT engine 201 processes FFT results FFT1 to FFT4,
 the CFAR engine 202 computes CFAR results CFAR1 to CFAR4 based on the FFT results FFT1 to FFT4,
 the DMA unit 206 conveys the FFT result FFT1 and the CFAR results CFAR1 to CFAR4 to the memory for further processing.

Depending on the sampling rate, a free (empty) slot may be obtained for the DMA unit 206 on each new ramp: The first FFT results determined are based on the frequency range of the full ramp; hence, FFT1 is available after the previous ramp has been analyzed. In the example shown in FIG. 7, the FFT result FFT1 is based on the previous ramp.

Advantageously, based on the FFT/CFAR pipelining concept, a time slot is available to write raw data (i.e. FFT results) to the memory via the DMA unit 206. For example, this raw data may be based on the FFT results of the first antenna.

This allows selecting, e.g., via software, to write raw data (FFT results) every n-th ramp. The raw data can be used together with the CFAR results for further processing, wherein the raw data could be used, e.g., to detect noise changes in the overall frequency range as the raw data is not limited to certain bins (frequency ranges) to which the CFAR results are directed.

It is an option that the data stored to the memory by the DMA unit 206 may be of less precision than the data provided by the FFT engine 201. In particular, data reduction can be utilized in order to save memory space. In this regard, FFT results conveyed from the FFT engine 201 to the CFAR engine 202 may be of full resolution, but the data eventually being stored in the memory have a reduced resolution.

FIG. 8 shows an exemplary CFAR use case comprising two antennas 801 and 802, wherein CFAR results are computed on ramp 803 of antenna 801 thereby determining bins of interest for further processing. Subsequently, the same CFAR conditions are applied on the ramp 804 of the antenna 802. Hence, the computation of the CFAR results for the ramp 803 can be used for filtering the corresponding bins in the FFT results of the second antenna 802.

FIG. 9 shows another exemplary CFAR use case comprising two antennas 901 and 902, wherein CFAR results are computed on ramps 903 to 910 of antenna 801 thereby determining bins of interest for further processing. The same CFAR conditions are applied on the ramps 911 to 918 of the antenna 802, i.e. the CFAR condition of ramp 903 is applied to ramp 911, the CFAR condition of ramp 904 is applied to ramp 912, etc.

FIG. 10 shows a further exemplary CFAR use case comprising two antennas 1001 and 1002, wherein CFAR results are computed on ramp 1003 of antenna 1001 thereby determining bins of interest for further processing. Subsequently, the same CFAR conditions are applied on the ramp 1005 of the antenna 1002. When the n-th subsequent ramp 1004 is reached, CFAR is computed for this ramp 1004 of antenna 1001 and the CFAR conditions determined are used on the ramp 1006 of the antenna 1002.

FIG. 11 shows yet another exemplary CFAR use case comprising two antennas 1101 and 1102, wherein CFAR computation is conducted by a microcontroller for this ramp 1103 of antenna 1101 thereby determining bins of interest for further processing. A few ramp cycles 1104 may pass until the results of the CFAR computation are available. When is available the CFAR results may be written to the memory and the CFAR results may be used for other ramps of other antennas, e.g., ramps of the antenna 1102 according to FIG. 11.

Figure 5:
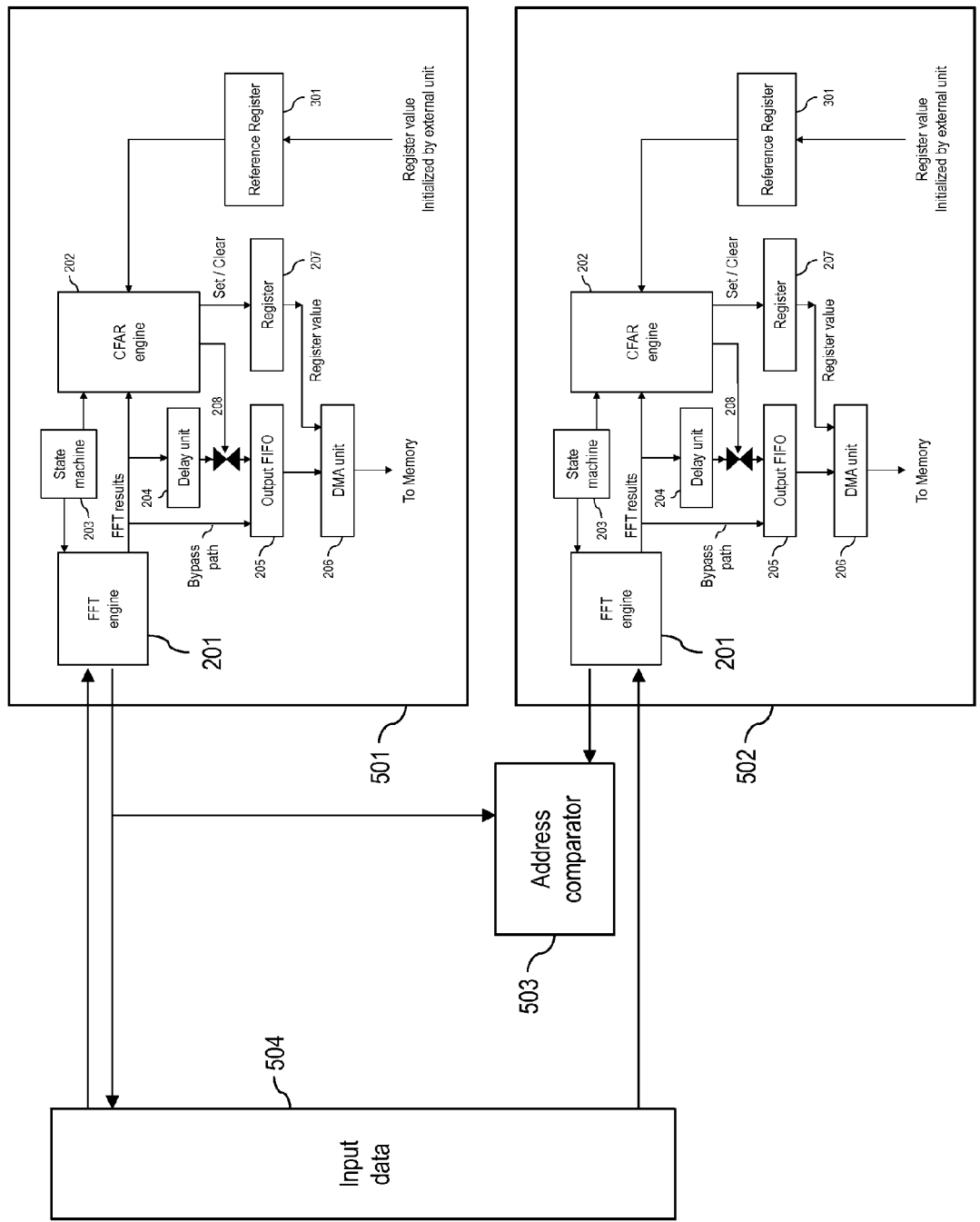
FIG. 5 shows a schematic architecture combining two modules, wherein each of the modules comprises the architecture shown in FIG. 4.

FIG. 5 shows a schematic architecture combining two modules 501 to 502, wherein each module 501, 502 comprises the architecture shown in FIG. 4.

Input data 504 are conveyed to the FFT engine 201 of the module 501 and to the module 502. The FFT engine 201 of the module 501 and the FFT engine 201 of the module 502 each provides a request to read data from the input data 504. Such request may comprise at least one address and a control signal. To enhance safety, two FFT engines can be operated synchronously. Hence, by comparing the signals sent to the input 504, an anomaly within any of the modules 501, 502 can be detected. When active, an error indicated by a comparator may generate an event for an MCU (e.g., an interrupt, a flag in status register or the like). It is noted that two FFT engines 501 and 502 that are synchronously active may operate on the same data or on different data.

The example according to FIG. 5 comprises two modules 501, 502 that can be used in parallel, wherein each module 501, 502 may compute a portion, e.g., half, of the FFT results.

Such arrangement of modules 501, 502 can be used to enhance safety at reduced costs. As an example, the FFT engines 201 of the modules 501, 502 may run in a synchronized mode. Such synchronization may be achieved via the address comparator 503: An address to input data may be compared for each memory access. It is also an option to compare internal addresses directed to internal output buffers of the modules 501, 502.

Figure 12:
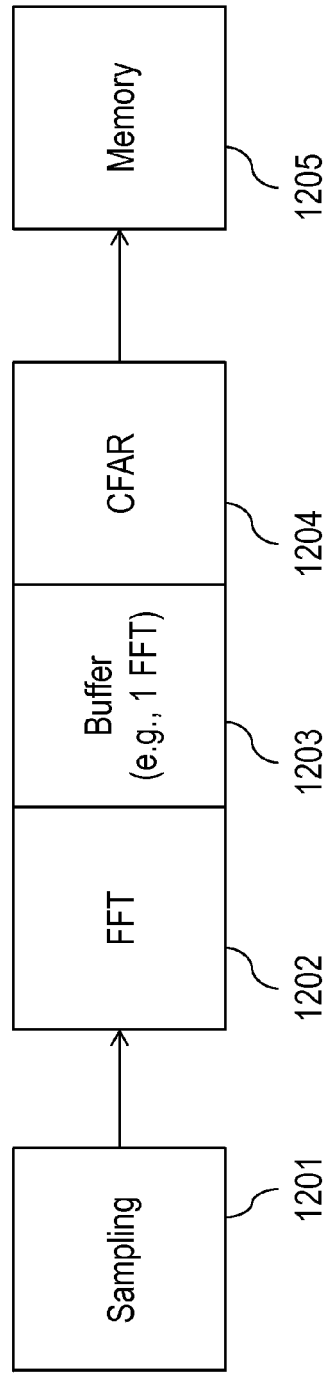
FIG. 12 shows a schematic block diagram comprising a sampling stage supplying digital data to an FFT engine, which is connected with a CFAR engine via a buffer.

FIG. 12 shows a schematic block diagram comprising a sampling stage 1201 supplying digital data to an FFT engine 1202, which is connected with a CFAR engine 1204 via a buffer 1203. The buffer 1203 may be a small buffer, it may in particular be dimensioned for storing an FFT result (or a predefined number of FFT results). The CFAR engine 1204 may provide CFAR results to be stored in a memory 1205. In addition (not shown in FIG. 12), the FFT engine 1202 may provide results that are directly stored in the memory 1205.

Figure 13:
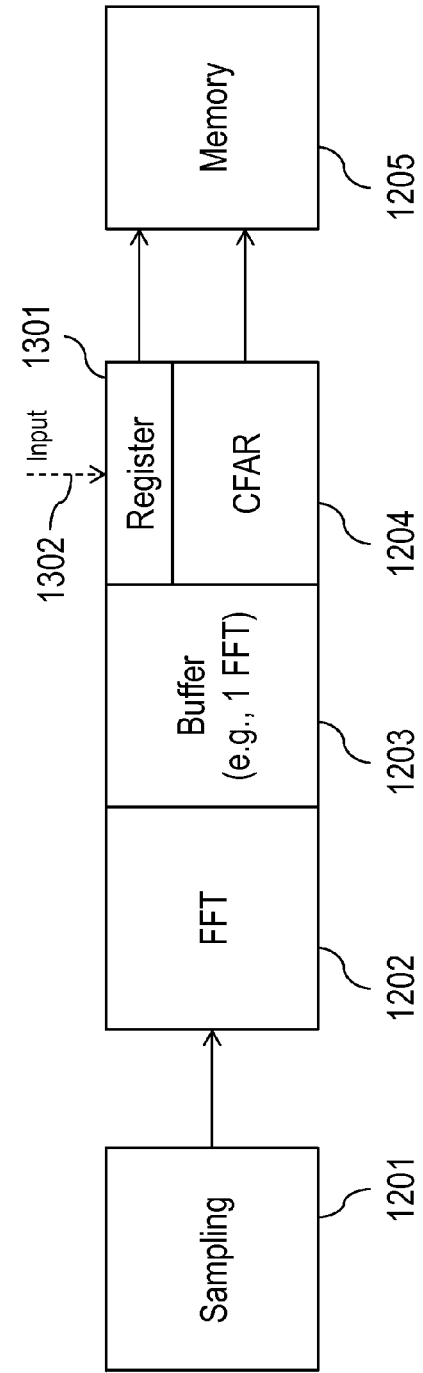
FIG. 13 shows a schematic block diagram based on FIG. 12, wherein in addition to FIG. 12 a register is provided, which may optionally be fed by external input data.

FIG. 13 shows a schematic block diagram based on FIG. 12, wherein in addition to FIG. 12 a register 1301 is provided, which may optionally be fed by external input data 1302. The register 1301 may store which bin(s) is/are of interest. Filtering of bins may be achieved via this register 1301. Filtering can be triggered internally or based on the external input data 1302.

The memory 1205 may comprise an array for filtered results or an array for unfiltered results.

Advantageously, the FFT engine 1202, the buffer 1203, the CFAR engine 1204 and optionally the register 1301 can be arranged in a single device, in particular on a single chip (e.g., die, piece of silicon or the like).

The solution in particular allows calculating FFT results on the fly and storing one of the FFT results in the buffer 1203. The CFAR engine may operate on intermediate FFT results. Advantageously, only bins of interest need to be stored in memory.

The approach can be efficiently combined with a subsequent stage FFT based on CFAR results.

FURTHER ADVANTAGES AND EMBODIMENTS

The solution presented may advantageously only require a reduced amount of memory compared to prior art solutions. It is another beneficial option that only such FFT results need to be stored that are of interest for further processing. Hence, the memory used may have lower bandwidth requirements and post processing units may be of less performance to achieve the same results.

In addition, the solution is highly power-efficient (in terms of, e.g., watts per MIPS—million instructions per second), which may result in a reduction of clock frequency of the main CPU and/or the signal processor.

The solution also has high flexibility and may support various modes, e.g., CFAR, no CFAR, CFAR per ramp, CFAR per n ramps, CFAR from external unit, etc.

Further, the approach allows cascading of radar devices with FFT and CFAR features.

At least one of the following examples and/or embodiments may be considered innovative. They might be combined with other aspects or embodiments as described. Any embodiment or design described herein is not necessarily to be construed as preferred or advantageous over other embodiments or designs.

A method is provided for processing radar signals, wherein said radar signals comprise digitized data received by at least two radar antennas, comprising the steps
    determining CFAR results on FFT results based on data received by a first antenna;
    applying the CFAR results to FFT results based on data received by a second antenna.

Hence, FFT results may be determined for each of the first and second antenna, wherein CFAR results may be computed for the first antenna and these CFAR results can be used for filtering FFT results determined by the second antenna.

In an embodiment, the method comprises the steps
    determining the CFAR results in a first computation mode of a CFAR engine;
    applying the CFAR results in a filtering mode of the CFAR engine In an embodiment, determining CFAR results comprises determining FFT results based on a CFAR computation based on FFT results that are based on digitized data received by the first antenna.

In an embodiment,
    applying the CFAR results comprises determining FFT results that are based on digitized data received by the second antenna,
    the FFT results are determined based on the CFAR results, in particular based on frequencies selected by the CFAR computation.

In an embodiment, the method comprises the step
    applying the CFAR results on FFT results based on data received by an additional antenna.

Hence, the approach presented may be utilized for more than two antennas. In particular the CFAR results may be utilized (e.g., for filtering FFT results) for all antennas that are used to detect emitted radar signals from a radar device.

In an embodiment, the method comprises the step
    storing FFT results that correspond to the CFAR results determined.

The FFT results determined by CFAR computation and/or the FFT results determined by CFAR filtering can be stored in an internal memory or in an external memory.

In an embodiment, the method comprises the steps
    compressing the FFT results that correspond to the CFAR results determined; and
    storing the compressed FFT results in a memory.

It is an option to reduce the size of the FFT results prior to storing them in the memory.

In an embodiment, the method comprises the step
    determining CFAR results on FFT results based on data received by a first antenna during a measurement cycle.

In an embodiment, the measurement cycle corresponds to a measurement period defined by a ramp of emitted radar signals with varying frequencies.

In an embodiment, the method comprises the step
    determining CFAR results on FFT results based on data received by a first antenna during every n-th measurement cycle.

In an embodiment, the method comprises the steps
    determining CFAR results on FFT results based on data received by a first antenna during a measurement cycle;
    waiting for a predefined duration, in particular for the duration of at least one measurement cycle;
    applying the CFAR results on FFT results based on data received by the second antenna.

In an embodiment, the CFAR results are determined and applied at a first-stage FFT or at a subsequent stage FFT.

For example, the solution described herein can be utilized at a second stage FFT or any subsequent stage FFT. In particular, FFT and CFAR processing can be part of such second stage FFT (or any subsequent stage FFT) operation.

In an embodiment, the method comprises the step:
    storing FFT results based on the CFAR results in a predetermined sequence.

For example, CFAR results may be determined and FFT results may be (pre-)ordered and stored, e.g., in a non-sequential memory, to allow effective operation of a next (e.g., second) stage FFT. Hence, the FFT results may be ordered such that a subsequent stage FFT may efficiently (e.g., sequentially) read the previously stored data. This enhances performance of the second stage FFT and it allows for a beneficial use of a wide memory access.

Hence, it is an option to spend some time in pre-ordering the results of the first stage FFT to have them available in an efficient way at a second stage FFT, i.e. to conduct the second stage FFT faster. It is noted that instead of second stage FFT any subsequent stage FFT can be used or applied.

In an embodiment, the method comprises the step
the CFAR results are determined based on a predefined condition, wherein the predefined condition comprises at least one of the following:
a driving situation of a vehicle;
a transmission mode for the radar signals;
a reception mode for the radar signals;
a signal power.

A transmission mode may comprise a number of transmitted ramps; a reception mode may comprise a number of active reception channels.

Hence, an initial CFAR filtering or CFAR computation can be conducted to determine bins or a selection of bins depending on various conditions, e.g., the driving situation of the car, etc. This may in particular be beneficial after a first stage combined FFT/CFAR processing has been conducted as described herein.

For example, if a vehicle has stopped, the focus of processing signals and detection could be on a short distance ahead of the vehicle, which may result in considering such bins that relate to such short distance; other bins may be eliminated by the CFAR engine (e.g., via filtering). In case the car is moving, the focus may shift to bins representing a longer distance ahead of the vehicle and the bins relating to a (very) short distance can be eliminated (e.g., filtered).

As an option, after a second stage FFT, the CFAR engine may filter FFT results based on calculating a signal power for each bin.

A device for processing radar signals is suggested, the device
comprising a FFT engine for determining FFT results based on digitized data received from at least two antennas;
comprising a CFAR engine which is operable
in a computation mode for determining CFAR results based on the FFT results of one of the antennas; and
in a filtering mode for filtering FFT results of at least one other antenna based on the CFAR results determined in the computation mode.

In an embodiment, the device comprises a memory for storing FFT results.

In an embodiment, said memory is arranged for storing at least one FFT result identified by the CFAR results.

In an embodiment, the FFT engine, the CFAR engine and the memory are integrated on a single substrate, in particular a semiconductor, a die or a chip.

In an embodiment, the CFAR unit is arranged to operate on a full precision of FFT results, and wherein FFT results of reduced size are stored in the memory.

Hence, any of the elements of the device may utilize data compression to reduce the size (e.g., resolution or precision) of the FFT results prior to them being stored in the memory.

In an embodiment, the FFT engine is arranged to operate at full speed when the CFAR engine is not active and at a reduced speed when the CFAR engine is active.

In an embodiment, the CFAR engine is operable in the filtering mode for filtering FFT results based on a filtering information supplied by an external device.

The filtering information may be used to also filter FFT results of any of the antennas. This allows for concurrent filtering among several devices, in particular synchronization and/or control of such devices.

In an embodiment, the device comprises a register to which the filtering information is written by the external device.

In an embodiment, the FFT engine comprises a reordering buffer for storing FFT results such that they can be efficiently accessed by a subsequent stage FFT processing.

Hence, the FFT results can be pre-ordered such that it allows faster processing of the second stage FFT.

It is in particular an option that FFT results are written into an interim memory of smaller size than the one require to write all FFT results of a given ramp. The CFAR engine may, e.g., in real-time, access this interim memory and write computed and/or filtered FFT results into a memory that is utilized for storing FFT results for at least one ramp.

A module is provided comprising at least two devices as described herein, further comprising an address comparator connected to the FFT engine of each of the devices for synchronizing operation of the at least two devices.

Hence, safety and/or redundancy can be provided by synchronizing several of the above mentioned devices. It is also an option to share the workload between the several devices of the module. This may enhance safety and/or performance.

Also, a system is suggested for processing radar signals comprising:
means for providing first FFT results based on data received by a first antenna and for providing second FFT results based on data received by a second antenna;
means for determining CFAR results on the first FFT results and for applying the CFAR results to the second FFT results.

In an embodiment, the system comprises means for storing the first FFT results and/or the second FFT results.

In an embodiment, the system comprises means for reducing the size of the FFT results before storing them.

Although various exemplary embodiments have been disclosed, it will be apparent to those skilled in the art that various changes and modifications can be made which will achieve some of the advantages without departing from the spirit and scope of the described embodiments. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the embodiments may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for processing radar signals, comprising a FTT engine for determining FTT results based on digitized data received from at least two antennas;
a CFAR engine which is operable
in a computation mode for determining CFAR results based on the FFT results of one of the antennas; and in a filtering mode for filtering FFT results of at least one other antenna based on the CFAR results determined in the computation mode.

2. The device according to claim 1, comprising a memory for storing FFT results.

3. The device according to claim 2, wherein said memory is arranged for storing at least one FFT result identified by the CFAR results.

4. The device according to claim 2, wherein the FFT engine, the CFAR engine and the memory are integrated on a single substrate, the single substrate being a semiconductor, a die or a chip.

5. The device according to claim 2, wherein the CFAR engine is arranged to operate on a full precision of FFT results, and wherein FFT results of reduced size are stored in the memory.

6. The device according to claim 1, wherein the FFT engine is arranged to operate at full speed when the CFAR engine is not active and at a reduced speed when the CFAR engine is active.

7. The device according to claim 1, wherein the CFAR engine is operable in the filtering mode for filtering FFT results based on a filtering information supplied by an external device.

8. The device according to claim 7, further comprising a register to which the filtering information is written by the external device.

9. The device according to claim 1, wherein the FFT engine comprises a reordering buffer for storing FFT results such that they can be efficiently accessed by a subsequent stage FFT processing.

10. A module comprising at least two devices according to claim 1, further comprising an address comparator connected to the FFT engine of each of the devices for synchronizing operation of the at least two devices.

11. A system for processing radar signals comprising:
   means for providing first FFT results based on data received by a first antenna and for providing second FFT results based on data received by a second antenna;
   means for determining CFAR results on the first FFT results and for applying the CFAR results to the second FFT results.

12. The system according to claim 11, further comprising means for storing the first FFT results and/or the second FFT results.

13. The system according to claim 12, further comprising means for reducing the size of the FFT results before storing them.

* * * * *